US012732313B2

(12) United States Patent
Hu et al.

(10) Patent No.: US 12,732,313 B2
(45) Date of Patent: Sep. 8, 2026

(54) METHOD FOR DETERMINING DRX ACTIVATION TIME AND TERMINAL DEVICE

(71) Applicant: GUANGDONG OPPO MOBILE TELECOMMUNICATIONS CORP., LTD., Dongguan (CN)

(72) Inventors: Yi Hu, Dongguan (CN); Haitao Li, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 299 days.

(21) Appl. No.: 18/396,495

(22) Filed: Dec. 26, 2023

(65) Prior Publication Data

US 2024/0129072 A1 Apr. 18, 2024

Related U.S. Application Data

(63) Continuation of application No. PCT/CN2021/105072, filed on Jul. 7, 2021.

(51) Int. Cl.
*H04W 76/28* (2018.01)
*H04L 1/1829* (2023.01)
*H04L 5/00* (2006.01)

(52) U.S. Cl.
CPC ........... *H04L 1/1864* (2013.01); *H04W 76/28* (2018.02)

(58) Field of Classification Search
None
See application file for complete search history.

(56) References Cited

U.S. PATENT DOCUMENTS 8,305,961 B2 11/2012 Kuo
2009/0180427 A1 7/2009 Kuo
2020/0229093 A1 7/2020 Ahmad
2020/0245395 A1* 7/2020 Zhang .................. H04L 5/0053
2020/0313808 A1 10/2020 Lee
2021/0029641 A1* 1/2021 Khoshnevisan ...... H04L 1/1864
2021/0037468 A1* 2/2021 Huang ................ H04W 72/044
2022/0353017 A1* 11/2022 Babaei .................. H04L 1/1812
2022/0394734 A1* 12/2022 MolavianJazi ... H04W 72/0446
(Continued)

FOREIGN PATENT DOCUMENTS

CN 101483885 A 7/2009
CN 110876210 A 3/2020
CN 112399435 A 2/2021

OTHER PUBLICATIONS

Huawei, "DRX configuration coordination in (NG)EN-DC", 3GPP TSG-RAN WG2 Meeting#107bis R2-1913735 Chongqing, China, Oct. 14-18, 2019, section 5.7, and figure 11. 20 pages.
(Continued)

*Primary Examiner* — Duc T Duong
(74) *Attorney, Agent, or Firm* — BAYES PLLC

(57) ABSTRACT

Embodiments of the present invention provide a method for determining a DRX activation period and a terminal device, which are applied to the technical field of communications. The embodiments of the present invention comprise: determining a discontinuous reception (DRX) activation period according to a transmission duration of a physical uplink shared control channel (PUSCH) binding transmission and first round-trip time (RTT).

20 Claims, 6 Drawing Sheets

(56) References Cited

U.S. PATENT DOCUMENTS

2024/0049343 A1* 2/2024 Back .................... H04W 72/02

OTHER PUBLICATIONS

International Search Report in the international application No. PCT/CN2021/105072, mailed on Mar. 31, 2022. 5 pages with English translation.
Written Opinion of the International Search Authority in the international application No. PCT/CN2021/105072, mailed on Mar. 31, 2022. 8 pages with English translation.
MediaTek Inc. "New Study WID on NB-IoT/eTMC support for NTN", 3GPP TSG RAN Meeting #86 RP-193235 Sitges, Spain, Dec. 9-31, 2019, section 4. 4 pages.
InterDigital, "Stage-3 running CR for TS 38.321 for Rel-17 NTN", 3GPP RAN WG2 Meeting #114 R2-2106542 eMeeting May 19-May 27, 2021, the whole document. 28 pages.
ASUSTeK, "Correction on DRX with bundle transmission of configured uplink grant", 3GPP TSG-RAN2 #112e R2-2011045 Electronic meeting, Nov. 2 to 13, 2020, the whole document. 10 pages.
CATT, "Discussion on HARQ Aspects and UL Scheduling Enhancement in NTN", 3GPP TSG-RAN WG2 Meeting #114-e R2-2104851 Electronic meeting, May 19-27, 2021, the whole document. 5 pages.
Vice Chairman (ZTE Corporation), "Report from Break-out session on R16 eMIMO, CLI, PRN, RACS and R17 NTN and REDCAP", 3GPP TSG-RAN WG2 Meeting #112 electronic R2-2010702 Online, Nov. 2-13, 2020, the whole document. 50 pages.
Nokia et al., "MPDCCH monitoring for receiving HARQ ACK feedback", 3GPP TSG-RAN WG2 Meeting #103 R2-1812874 Gothenburg, Sweden, Aug. 20-24, 2018, the whole document. 2 pages.
InterDigital (email discussion Rapporteur), "Summary of [AT111][107][NTN] Pre-compensation and other MAC issues", 3GPP RAN WG2 Meeting #111e R2-2008188 Aug. 17-28, 2020, the whole document. 64 pages.
Ericsson et al: "DRX adaptions for NTN", 3GPP Draft; R2-1915566, 3rd Generation Partnership Project (3GPP), Mobile Competence Centre; 650, Route Des Lucioles; F-06921 Sophia-Antipolis Cedex; France, vol. RAN WG2, No. Reno, Nevada, US; Nov. 18, 2019-Nov. 22, 2019, Nov. 7, 2019 (Nov. 7, 2019), XP051815977, the whole document.
Ericsson: "On scheduling, HARQ, and DRX for NTN", 3GPP Draft; R2-2010168, 3rd Generation Partnership Project (3GPP), Mobile Competence Centre; 650, Route Des Lucioles; F-06921 Sophia-Antipolis Cedex; France, vol. RAN WG2, No. E-Meeting; Nov. 2, 2020-Nov. 13, 2020, Oct. 22, 2020 (Oct. 22, 2020), XP052363209, the whole document.
Supplementary European Search Report in the European application No. 21948806.1, mailed on Jun. 19, 2024. 10 pages.

* cited by examiner

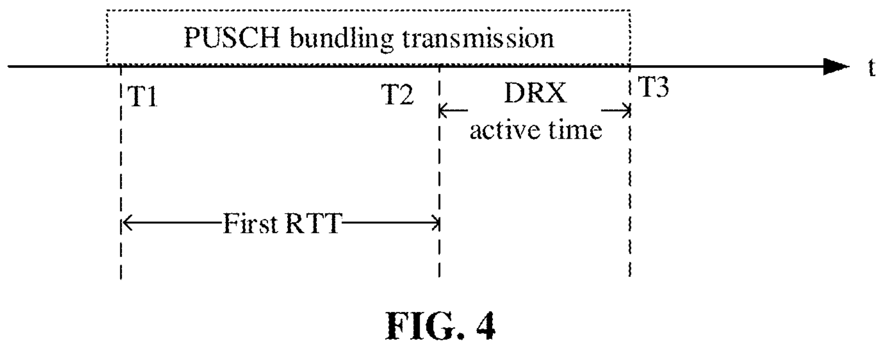
FIG. 4
HARQ ID 0
PUSCH bundling transmission
T1
T2
DRX
active
time
T3
T4
Start a first timer corresponding to the HARQ ID 0
Start Uplink retransmission timer corresponding to the HARQ ID 0 when the first timer expires
First RTT
Transmission duration of PUSCH bundling transmission
FIG. 5
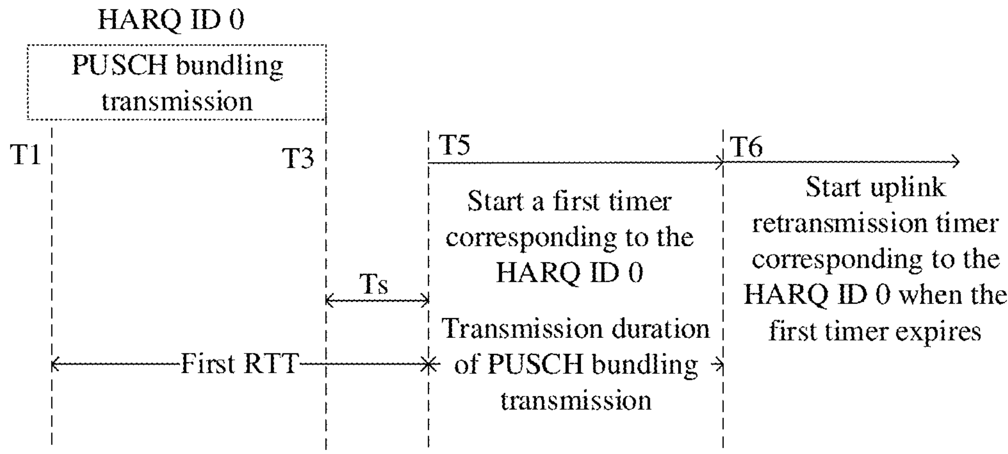
FIG. 6

Terminal Device

Radio Frequency Circuit

1410

Receiver 1411

Transmitter 1412

1430

Processor

1420

Memory

METHOD FOR DETERMING DRX ACTIVATION TIME AND TERMINAL DEVICE

CROSS-REFERENCE TO RELATED APPLICATION

This application is a continuation of International Application No. PCT/CN2021/105072, filed on Jul. 7, 2021, the contents of which is hereby incorporated by reference in its entirety.

TECHNICAL FIELD

Embodiments of the disclosure relate to the field of communication technologies, and more particularly to a method for determining a Discontinuous Reception (DRX) active time and a terminal device.

BACKGROUND

At present, in Long Term Evolution (LTE), one purpose for transmitting uplink (UL) Hybrid Automatic Repeat Request (HARQ) Acknowledgement (HARQ-ACK) feedback information is to terminate a Physical Uplink Shared Channel (PUSCH) transmission, and the other purpose is to terminate a listening to a Machine Type Communication (MTC) Physical Downlink Control Channel (MPDCCH) for indicating uplink retransmission. The former corresponds to the fact that a base station can successfully receive PUSCH by using partial repeated transmission, and the latter corresponds to the fact that the base station successfully receives PUSCH of all HARQ processes. In Terrestrial Network (TN), a Round Trip Time (RTT) of signal transmission between a terminal device and a network device is very short. The time for the base station to feedback UL HARQ-ACK feedback information mainly considers a decoding time after the network device receives PUSCH and a time for allocating resources of transmitting the UL HARQ-ACK feedback. Usually, the time for the base station to feedback UL HARQ-ACK feedback information is a few milliseconds, which is longer than the RTT of signal transmission between the terminal device and the network device. As a result, in order to support the UL HARQ-ACK feedback, the terminal device enters a DRX active time during transmitting repeated transmission of the PUSCH, and also, the terminal device starts immediately a DRX uplink retransmission timer corresponding to the HARQ process used for the PUSCH transmission after completing the repeated transmission of the PUSCH. In such way, the terminal device continuously listens to the PDCCH used to indicate the UL HARQ-ACK feedback during the PUSCH transmission and for a period of time after the PUSCH transmission is completed.

However, in Non-Terrestrial Network (NTN), the signal propagation delay between the terminal device and network device increases greatly, and the RTT is much longer than the terminal device processing time considered in the existing TN device standards. In case that the terminal device still uses the existing DRX mechanism, the terminal device may perform unnecessary PDCCH listening due to the long RTT in NTN, which is not conductive to power saving of the terminal device.

SUMMARY

Embodiments of the disclosure provide a method for determining a DRX active time and terminal devices, which may solve a problem that the existing DRX mechanism is still used in NTN, which leads to unnecessary PDCCH listening of the terminal device and is not conductive for power saving of the terminal device.

In a first aspect, a method for determining a DRX active time is provided, which includes: the DRX active time is determined according to a transmission duration of a Physical Uplink Shared Channel (PUSCH) bundling transmission and a first RTT.

In a second aspect, a terminal device is provided, which includes a processor. The processor is configured to: determine a DRX active time according to a transmission duration of a PUSCH bundling transmission and a first RTT.

In a third aspect, a computer-readable storage medium is provided, which includes computer instructions that, when run on a computer, cause the computer to perform the method in the above-described first aspect or in any alternative implementation of the first aspect.

BRIEF DESCRIPTION OF THE DRAWINGS

FIG. 4 is a first schematic diagram illustrating a determined DRX active time according to the embodiment of the disclosure.

FIG. 5 is a second schematic diagram illustrating a determined DRX active time according to an embodiment of the disclosure.

FIG. 6 is a third schematic diagram illustrating a determined DRX active time according to the embodiment of the disclosure.

DETAILED DESCRIPTION

Figure 1A:
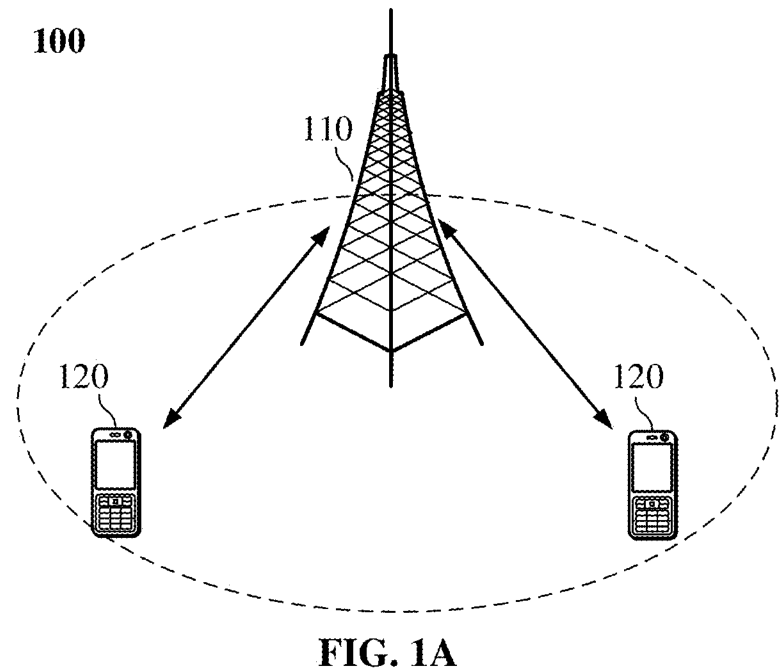
FIG. 1A is a first schematic diagram of an architecture illustrating a wireless communication system according to an embodiment of the disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

In embodiments of the disclosure, the words "exemplary" or "for example" are used as examples, illustrations, or explanations. Any embodiment or solution described as "exemplary" or "for example" in embodiments of the disclosure should not be interpreted as being more preferred or advantageous than other embodiments or designs. Specifically, the use of the words "exemplary" or "for example" is intended to present the relevant concepts in a specific manner.

Firstly, NTN Related Background

In the related technologies, the third Generation Partnership Project (3GPP) is studying NTN technology, which generally provides communication services to ground users through satellite communication. Compared to terrestrial cellular network communication, satellite communication has the following advantages.

Firstly, satellite communication is not limited by user regions. For example, general land communication cannot cover areas such as oceans, mountains, desert or the like where communication equipment cannot be set up or that are not be covered by communication due to the scarcity of population. For satellite communication, because a single satellite can cover a large area of the ground and can orbit around the earth, theoretically every corner of the earth can be covered by satellite communication.

Secondly, satellite communication has significant social value. Remote mountainous areas, and poor and underdeveloped countries or regions can be covered by Satellite communication at a lower cost, so that people in these areas can enjoy advanced voice communication and mobile internet technology, which is conducive to narrowing the digital divide with developed areas and promoting the development of these areas.

Thirdly, the satellite communication distance is long, and the communication cost does not increase significantly with the increase of communication distance. Finally, satellite communication has high stability and is not limited by natural disasters.

Communication satellites can be divided into low-Earth orbit (LEO) satellites, medium-Earth orbit (MEO) satellites, geostationary Earth orbit (GEO) satellites, high elliptical orbit (HEO) satellites and the like according to their orbital altitudes. At present, LEO and GEO are mainly studied.

1. LEO

The altitude range of LEO satellites is 500 km-1500 km, and the corresponding orbital cycle is about 1.5 hours-2 hours. The signal propagation delay between user equipment and a satellite in single-hop communication is generally less than 20 ms. The maximum satellite visible time is 20 minutes. The signal propagation distance is short, the link loss is low, and the transmission power requirements for the user terminals are not high.

2. GEO

An orbital altitude of GEO is 35786 km and a rotation cycle around the Earth of is 24 hours. The signal propagation delay between user equipment and a satellite in single-hop communication is generally 250 ms.

In order to ensure the coverage of satellites and improve the system capacity of the entire satellite communication system, satellites cover the ground with multiple beams, and a single satellite can form dozens or even hundreds of beams to cover the ground. A single satellite beam can cover a ground area with a diameter of tens to hundreds of kilometers.

As an example, FIG. 1A is a schematic diagram of an architecture illustrating a communication system according to an embodiment of the disclosure. As illustrated in FIG. 1A, the communication system 100 may include a network device 110, which may be a device that communicates with a terminal device 120 (or referred to as a communication terminal, or a terminal). The network device 110 may provide communication coverage for a specific geographic area and may communicate with terminal devices located within that coverage area.

FIG. 1A exemplarily illustrates one network device and two terminal devices. Optionally, the communication system 100 may include multiple network devices, and other numbers of terminal devices may be included within the coverage range of each network device, which is not limited by embodiments of the disclosure.

Figure 1B:
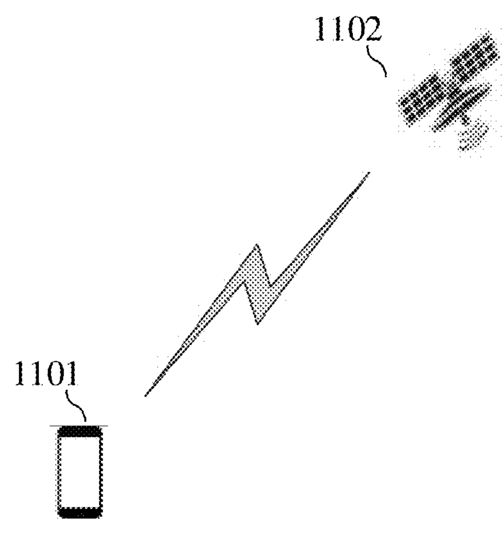
FIG. 1B is a second schematic diagram of an architecture illustrating a wireless communication system according to an embodiment of the disclosure.

As an example, FIG. 1B is another schematic diagram of an architecture illustrating a communication system according to an embodiment of the disclosure. As illustrated in FIG. 1B, the communication system includes a terminal device 1101 and a satellite 1102. Wireless communication may be conducted between the terminal device 1101 and the satellite 1102. The network formed between the terminal device 1101 and the satellite 1102 may also be referred to as an NTN. In the architecture of the communication system illustrated in FIG. 1B, the satellite 1102 may have the function of a base station, and terminal device 1101 and the satellite 1102 may communicate directly. Under the system architecture, the satellite 1102 can be referred to as a network device. Optionally, the communication system may include multiple network devices 1102, and other numbers of terminal devices may be included within the coverage range of each network device 1102, which is not limited by embodiments of the disclosure.

Figure 1C:
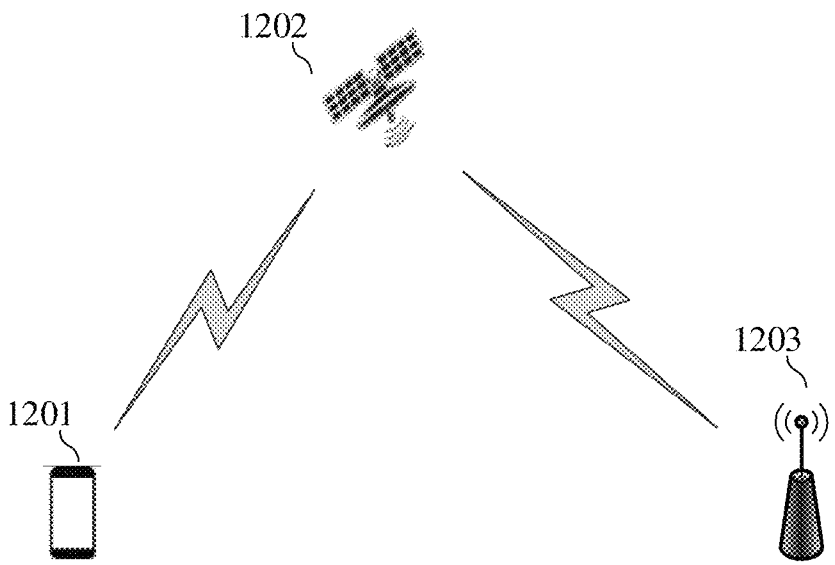
FIG. 1C is a third schematic diagram of an architecture illustrating a wireless communication system according to an embodiment of the disclosure.

As an example, FIG. 1C is another schematic diagram of an architecture illustrating a communication system according to an embodiment of the disclosure. As illustrated in FIG. 1C, the communication system includes a terminal device 1201, a satellite 1202, and a base station 1203. Wireless communication may be conducted between the terminal device 1201 and the satellite 1202, and the satellite 1202 may be communicates with the base station 1203. A network formed among the terminal device 1201, the satellite 1202 and the base station 1203 may also be referred to as an NTN. In the architecture of the communication system illustrated in FIG. 1C, the satellite 1202 may not have the function of a base station, and the communication between the terminal device 1201 and the base station 1203 requires a transit through the satellite 1202. Under the system architecture, the base station 1203 may be referred to as a network device. Optionally, the communication system may include multiple network devices 1203, and other numbers of terminal devices may be included within the coverage range of each network device 1203, which is not limited by embodiments of the disclosure.

It should be noted that FIG. 1A to FIG. 1C are only illustrative examples of the system to which the disclosure applies. The method shown in the embodiment of the disclosure can also be applied to other systems, such as a fifth Generation (5G) communication system, an LTE communication system and the like, which are not limited by embodiments of the disclosure.

Optionally, the wireless communication system illustrated in FIG. 1A to FIG. 1C may also include other network entities such as a Mobility Management Entity (MME), an Access and Mobility Management Function (AMF) and the like, which are not limited by embodiments of the disclosure.

Secondly, a Physical Channel of Enhanced Machine Type Communication (eMTC)

The MPDCCH is used to send scheduling information, and is designed based on the Enhanced Physical Downlink Control Channel (EPDCCH) of Long Term Evolution LTE Release 11 (R11). The terminal device receives control information based on Demodulation Reference Signal (DMRS), and supports functions such as pre-encoding and beamforming of control information. One EPDCCH transmits one or more Enhanced Control Channel Elements (ECCEs), and the aggregation level can be {1, 2, 4, 8, 16, 32}. Each ECCE is composed of multiple Enhanced Resource Element Groups (EREGs). The maximum number of repetition of the MPDCCH is configurable, with a value range of {1, 2, 4, 8, 16, 32, 64, 128, 256}.

An eMTC Physical Downlink Shared Channel (PDSCH) is basically the same as a LTE PDSCH, but repetition and inter-narrowband frequency hopping are added to improve PDSCH channel coverage capability and interference averaging. An eMTC terminal device may operate in both Mode A and Mode B. In Mode A, the maximum number of uplink and downlink HARQ processes is 8, and in this mode, the number of PDSCH repetitions is {1, 4, 16, 32}. In Mode B, the maximum number of uplink and downlink HARQ processes is 2, and in this mode, the number of PDSCH repetitions is {4, 16, 64, 128, 256, 512, 1024, 2048}.

A frequency domain resource format of the Physical Uplink Control Channel (PUCCH) is the same as that in LTE, and frequency hopping and repeated transmission are supported. Mode A supports transmitting Hybrid Automatic Repeat Request (HARQ) Acknowledgement (HARQ-ACK) or HARQ Negative Acknowledgement (HARQ-NACK), Scheduling Request (SR) and Channel State Information (CSI) on the PUCCH, that is, it supports one of PUCCH format 1, PUCCH format 1a, PUCCH format 2 and PUCCH format 2a, with the number of repetitions of {1, 2, 4, 8}. Mode B does not support CSI feedback, only supports PUCCH format 1 or PUCCH format 1a, with the number of repetitions of {4, 8, 16, 32}.

A Physical Uplink Shared Channel (PUSCH) is the same as that in LTE, but the maximum number of Resource Blocks (RB) that can be scheduled is limited to 6. Mode A and Mode B are supported, and the number of repetitions of Mode A can be {8, 16, 32}, up to 8 processes with high speed are supported. A longer distance may be covered in Mode B, and the number of repetitions can be {192, 256, 384, 512, 768, 102, 1536, 2048}, up to 2 uplink HARQ processes are supported.

Thirdly, Discontinuous Reception (DRX) Process in the LTE

Figure 2:
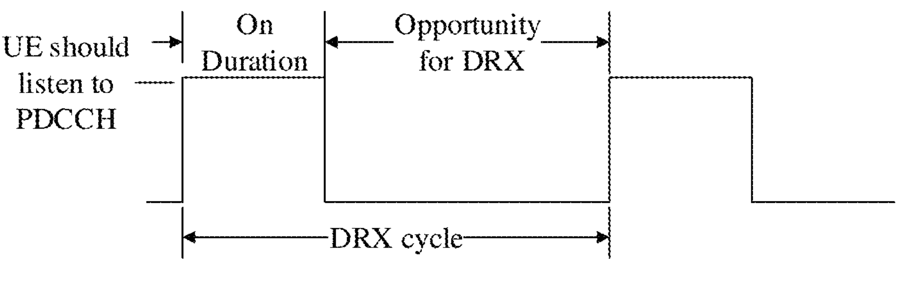
FIG. 2 is a schematic diagram illustrating a DRX cycle according to an embodiment of the disclosure.

As illustrated in FIG. 2, it is a schematic diagram of a DRX cycle, the condition for the terminal device to start or restart the drx-InactivityTimer is that after the terminal device receives the PDCCH indicating the initial downlink or uplink transmission, the drx-InactivityTimer can be started or restarted to enter the "On Duration" (also referred to as active time), during which data can be received, that is, PDCCH can be listened, and no data can be received during the opportunity for DRX (also referred to as sleep time) in the whole DRX cycle.

In the LTE, a network device may configure a DRX function for a terminal device, so that the terminal device listens to the PDCCH discontinuously, so as to save the power of the terminal device. Each Media Access Control (MAC) entity has a DRX configuration, and the configuration parameters of the DRX include:

DRX cycle (drx cycle);

DRX on duration timer (drx-onDurationTimer);

Delay for UE to start drx-onDurationTimer (drx-StartOffset);

DRX inactivity timer (drx-InactivityTimer);

DRX downlink retransmission timer (drx-RetransmissionTimer), each downlink HARQ process, except for the broadcast HARQ process, corresponds to one respective drx-RetransmissionTimer; and DRX uplink retransmission timer (drx-ULRetransmissionTimer), each uplink HARQ process corresponds to one drx-RetransmissionTimer.

If the terminal device is configured with DRX, the terminal device needs to listen to the PDCCH during the DRX active time. The DRX active time includes the following situations;

Any one of the following seven timers is running: drx-onDurationTimer; drx-InactivityTimer; drx-RetransmissionTimerDL; DRX retransmission timer with short cycle transmission time interval (drx-RetransmissionTimerShortTTI); drx-RetransmissionTimerUL; DRX retransmission timer with short cycle uplink transmission time interval (drx-ULRetransmissionTimerShortTTI); MAC contention resolution timer (mac-ContentionResolutionTimer).

A scheduling request (SR) is transmitted on the PUCCH or Short PUCCH (SPUCCH), and it is in a pending state.

In a contention-based random access process, after successfully receiving the random access response, the terminal device has not yet received an initial transmission indicated by the PDCCH which is scrambled based on a Cell Radio Network Temporary Identifier (C-RNTI).

An uplink grant (UL grant) can be received for a pending HARQ retransmission, and there is data in a HARQ buffer of the synchronous HARQ process.

mpdcch-UL-HARQ-ACK-FeedbackConfig is configured, and repeated transmission is currently performing within a bundle.

The terminal device determines a time to start the drx-onDurationTimer according to whether it is currently in a short DRX cycle or a long DRX cycle, the specific regulations are as follows.

1> If a Short DRX Cycle is used, and a current subframe meets [(SFN×10)+subframe number] modulo (drx-ShortCycle)=(drx-StartOffset) modulo (drx-ShortCycle);

Or, 1> If a Long DRX Cycle is used, and a current subframe meets [(SFN×10)+subframe number] modulo (drx-LongCycle)=drx-StartOffset;

Based on any one of the above 1>: 2> If it is Narrow Band Internet of Things (NB-IoT), the following 3> is executed:

3> If a UL HARQ RTT Timer or a HARQ RTT Timer corresponding to at least one HARQ process is not running, the drx-onDurationTimer is started.

2> If it is not NB-IoT, the drx-onDurationTimer is started directly.

Where SFN is the System Frame Number; subframe number is a subframe number where Physical Random Access Channel (PRACH) resources are located; drx-ShortCycle is a DRX short cycle; drx-LongCycle is a DRX long cycle; and drx-StartOffset is a DRX start slot offset.

The conditions for the terminal device to start or restart downlink Hybrid Automatic Retransmission Round Trip Time timer (HARQ RTT Timer) are as follows:

If the terminal device receives a PDCCH for indicating downlink transmission, or if the terminal device has a configured downlink grant in this subframe, then:

a) If the UE is an eMTC terminal device, there may be the following situations.

a1) If the physical layer indicates that transmission of multiple transport blocks (TB) is scheduled, the UE starts the HARQ RTT Timer corresponding to the downlink HARQ process used for the PDSCH of each of the multiple TBs after receiving a subframe in which a last repeated transmission of the PDSCH of a last TB of the multiple TBs is located.

a2) If the physical layer indicates that transmission of one transport block is scheduled, the UE starts the HARQ RTT Timer corresponding to the downlink HARQ process used for the PDSCH after receiving a subframe in which a last repeated transmission of the PDSCH is located.

b) If the UE is not an eMTC terminal device, the HARQ RTT Timer corresponding to the downlink HARQ process used for the PDSCH is started.

If the HARQ RTT Timer expires, the UE starts the drx-RetransmissionTimer corresponding to the downlink HARQ process in response to the data decoding of the HARQ process failing.

The conditions for the terminal device to start or restart Uplink Hybrid Automatic Retransmission Round Trip Time timer (UL HARQ RTT Timer) are as follows.

If the terminal device receives a PDCCH for indicating an uplink transmission using an asynchronous HARQ process, or if the terminal device has a configured uplink grant for an asynchronous HARQ process in this subframe, or if the terminal device receives a PDCCH for indicating an uplink transmission using one automatic HARQ process, then:

a) If there is no terminal equipment (UE) configured with MPDCCH uplink HARQ-ACK feedback configuration information (mpdcch-UL-HARQ-ACK-FeedbackConfig), the UE stops the drx-ULRetransmissionTimer corresponding to the uplink HARQ process used for the PUSCH.

a1) If the physical layer indicates that transmission of multiple TBs is scheduled, the UE starts the UL HARQ RTT Timer corresponding to the uplink HARQ process used for the PUSCH of each of multiple TBs in a subframe in which a last repeated transmission of the PUSCH of a last TB of the multiple TBs is completed.

a2) If the physical layer indicates that transmission of one TB is scheduled, the UE starts the UL HARQ RTT Timer corresponding to the uplink HARQ process used for the PUSCH in a subframe in which a last repeated transmission of the PUSCH is completely.

b) If mpdcch-UL-HARQ-ACK-FeedbackConfig is configured and the UL HARQ-ACK feedback has not been received after a last repeated transmission of the PUSCH, the drx-ULRetransmissionTimer corresponding HARQ process is started or restarted during the last repeated transmission of PUSCH transmission.

If the UL HARQ RTT Timer corresponding to an uplink HARQ process expires, the UE starts the drx-ULRetransmissionTimer corresponding to the uplink HARQ process.

UL HARQ ACK Feedback

For an eMTC terminal device with poor network device coverage, physical channel transmission requires multiple repeated transmissions, for example, PUSCH transmission in CE modeB in the worst case requires 2048 repeated transmissions. When receiving the PUSCH, the base station attempts to decode the repeated transmissions one by one. That is, the base station does not start decoding after receiving all 2048 repeated transmissions, therefore it is possible for the base station to successfully receive the PUSCH after receiving parts of the repeated transmissions. In order to reduce the power consumption of a full duplex (capable of receiving and transmitting simultaneously) eMTC terminal device, the base station may feedback an uplink HARQ-ACK feedback (UL HARQ-ACK feedback) as early as possible, so that the eMTC terminal device can stop the subsequent PUSCH repeated transmissions in time after receiving it, thereby achieving the purpose of energy saving.

At present, in LTE, for UL HARQ ACK feedback, one purpose is to terminate PUSCH transmission and the other purpose is to terminate MPDCCH listening. The former corresponds to the base station successfully receiving PUSCH through partial repetitions, while the latter corresponds to the base station successfully receiving PUSCH from all HARQ processes. In the terrestrial network device, the RTT of signal transmission between a terminal device and a network device is very short. A time for the base station to feedback UL HARQ-ACK feedback information mainly considers a decoding time after the network device receives PUSCH and a time for allocating resources for transmitting UL HARQ-ACK feedback, the time is usually a few milliseconds, which is longer than the RTT of signal transmission between the terminal device and the network device. As a result, in order to support the UL HARQ-ACK feedback, the terminal device enters a DRX active time during transmitting repeated transmission of the PUSCH, and also, the terminal device starts immediately drx-ULRetransmissionTimer corresponding to the HARQ process used for the PUSCH transmission after completing the repeated transmission of the PUSCH. In such way, the terminal device continuously listens to the PDCCH used to indicate the UL HARQ-ACK feedback during the PUSCH transmission and for a period of time after the PUSCH transmission is completed.

Compared to a traditional terrestrial cellular network device, the signal propagation delay between a terminal device and a network device in NTN significantly increases, and the RTT is much larger than the terminal device processing time considered in the existing terrestrial network device standard, which also poses new problems for UL HARQ ACK feedback mechanism. For example, the process that the terminal device sends partial repetitions of the PUSCH, the network device sends a UL HARQ ACK feedback after successfully receiving this partial repetitions and then the terminal device receives the UL HARQ ACK feedback, takes a long time (at least one RTT time). If the terminal device still uses the existing DRX mechanism, the terminal device may perform unnecessary PDCCH listening due to the long RTT, which is not conductive to power saving of the terminal device.

Based on the above problems, the embodiments of the disclosure provide a method for determining a DRX active time. A terminal device may determine a DRX active time according to a transmission duration of a PUSCH bundling transmission and a first RTT. PDCCH listening is performed during the DRX active time determined by the solution. Since the transmission duration of the PUSCH bundling transmission and the first RTT are considered when determining the DRX active time, unnecessary PDCCH listening will not be caused even in the scene where the RTT time is longer, thereby saving the power of the terminal device.

Embodiments of the disclosure describe various embodiments in connection with a network device and a terminal device. The terminal device may also be referred to as User Equipment (UE), an access terminal, a subscriber unit, a subscriber station, a mobile radio station, a mobile station, a remote station, a remote terminal, a mobile device, a user terminal, a terminal, a wireless communication device, a user agent, a user device or the like.

The terminal device may be a STAION (ST) in a WLAN, including a cell phone, a cordless phone, a Session Initiation Protocol (SIP) phone, a Wireless Local Loop (WLL) station, a Personal Digital Assistant (PDA) device, a handheld device with a wireless communication function, a computing device, another processing device connected to a wireless modem, a vehicle device, a wearable device, a terminal in the next generation communication system such as a next radio (NR) network, a terminal in the future evolved Public Land Mobile Network (PLMN) or the like.

In the embodiment of the disclosure, the terminal device may be deployed on land including indoor or outdoor, hand-held, wearable or vehicle, may also be deployed on the water surface (such as ships), may further be deployed in the air (such as airplanes, balloons, satellites and the like).

In the embodiment of the disclosure, the terminal device can be a Mobile Phone, a Pad, a computer with wireless transceiver function, a Virtual Reality (VR) terminal device, an Augmented Reality (AR) terminal device, a wireless terminal device in industrial control, a wireless terminal device in self-driving, a wireless terminal device in remote medical, a wireless terminal device in smart grid, a wireless terminal device in transportation safety, a wireless terminal device in smart city, a wireless terminal device in a smart home, or the like.

As an example rather than a limitation, in embodiments of the disclosure, the terminal device may also be a wearable device. Wearable devices, as known as wearable intelligent devices, are the collective term of wearable devices which is developed by using wearable technology to intelligently design daily wear items, such as glasses, gloves, watches, clothing and shoes. A wearable device is a portable device that is worn directly on the body or integrated into the clothes or accessories of user. The wearable device is not only a hardware device, but also realizes powerful functions through software support, data interaction and cloud interaction. Broadly speaking, wearable smart devices include, for example, smart watches or smart glasses, which have full functions, large size, and can realize complete or partial functions without relying on smart phones, and smart phones, and various smart bracelets and smart jewelry for sigh monitoring, which only focus on a certain type of application function and need to be used in conjunction with other devices.

The network device can also include access network devices and core network devices. That is, the wireless communication system also includes multiple core networks for communicating with the access network devices. The access network device may be an Evolutional Node B (eNB or e-NodeB for short), a macro base station, a micro base station (also referred to as a "small base station"), a pico base station, an access point (AP), a transmission point (TP) or a new generation Node B (gNodeB) in a long-term evolution (LTE) system, a next generation (mobile communication) new radio (NR) system or an authorized auxiliary access long-term evolution (LAA) system.

In the embodiment of the disclosure, the network device may be a device for communicating with the mobile device, and the network device may be an Access Point (AP) in WLAN, a Base Transceiver Station (BTS) in GSM or CDMA, a NodeB (NB) in Wideband Code Division Multiple Access (WCDMA), an Evolved Node B (eNB or eNodeB) in LTE, or a relay station or an Access Point, or a vehicle device, a wearable device, a network device in NR network (gNB), or a network device in future evolved PLMN network, or a network device in NTN network or the like.

As an example rather than a limitation, in embodiments of the disclosure, the network device may have mobility characteristics. For example, the network device may be a mobile device. Optionally, the network device can be a satellite or a balloon station. For example, the satellite may be low-Earth orbit (LEO) satellites, medium-Earth orbit (MEO) satellites, geostationary Earth orbit (GEO) satellites, high elliptical orbit (HEO) satellites and the like. Optionally, the network device can also be a base station arranged on land, water and the like.

In the embodiment of the disclosure, the network device can provide service for a cell, and the terminal device communicates with the network device through the transmission resources (for example, frequency domain resources, or spectrum resources) used by the cell. The cell can be a cell corresponding to a network device (for example, a base station), and the cell can belong to a macro base station or belong to a base station corresponding to a Small cell. The Small cell can include: a Metro cell, a Micro cell, a Pico cell, a Femto cell and the like. These small cells have the characteristics of small coverage and low transmission power, and are suitable for providing high-speed data transmission services.

It should be understood that a device having a communication function in a network/system in an embodiment of the disclosure may be referred to as a communication device. The communication device may include a network device and a terminal device with communication functions. The network device and the terminal device may be specific devices in embodiments of the disclosure and will not be described herein. The communication device may also include other devices in the communication system, for example, network controllers, mobility management entities, and other network entities, which are not limited in embodiments of the disclosure.

The technical solution of the embodiments of the disclosure can be applied to various communication systems. For example, Global System of Mobile communication (GSM) systems, Code Division Multiple Access (CDMA) systems, Wideband Code Division Multiple Access (WCDMA) systems, General Packet Radio Services (GPRSs), Long Term Evolution (LTE) systems, Advanced long term evolution (LTE-A) systems, New Radio (NR) systems, evolution systems of NR systems, and LTE-based access to unlicensed spectrum (LTE-U) systems, NR-based access to unlicensed spectrum (NR-U) systems, Non-Terrestrial Networks (NTN) systems, Universal Mobile Telecommunications Systems (UMTSs), Wireless Local Area Networks (WLANs), Wireless Fidelity (WiFi), 5th-Generation (5G) systems or other communication systems.

Optionally, the embodiment of the disclosure can be applied to Non-Terrestrial Networks (NTN) systems or Terrestrial Networks (TN) systems.

The communication system in the embodiment of the disclosure can be applied to Carrier Aggregation (CA) scenarios, Dual Connectivity (DC) scenarios, and Standalone (SA) deployment scenarios.

Optionally, the communication system in the embodiment of the disclosure can be applied to an unlicensed spectrum, and the unlicensed spectrum can also be considered as a shared spectrum, or the communication system in the embodiment of the disclosure can also be applied to a licensed spectrum, and the licensed spectrum can also be considered as a non-shared spectrum.

It is to be understood that terms "system" and "network" used herein may usually be exchanged. Herein, term "and/or" is only an association relationship describing associated objects and represents that three relationships may exist. For example, A and/or B may represent three conditions: independent existence of A, existence of both A and B and independent existence of B. In addition, character "/" used herein usually represents that the associated objects before and after form an "or" relationship.

It should be understood that the "indication" mentioned in embodiments of the disclosure may be a direct indication, an indirect indication, or a representation of related relationship. For example, A indicates B, which can represent that A directly indicates B, for example, B can be obtained through A; A indicates B, which also can represent that A indirectly indicates B, for example, A indicates C, and B can be obtained by C; A indicates B, which also can represent that there is an association between A and B.

In the description of embodiments of the disclosure, the term "correspondence" may represent that there is a direct correspondence or an indirect correspondence between the two, may also represent that an association relationship between the two, or a relationship between indication and being indicated, configuration and being configured or the like.

Optionally, the indication information in embodiments of the disclosure includes physical layer signaling, for example, at least one of Downlink Control Information (DCI), Radio Resource Control (RRC) signaling or Media Access Control Element (MAC CE).

Optionally, a high layer parameter or a high layer signaling in embodiments of the disclosure includes at least one of Radio Resource Control (RRC) signaling or Media Access Control Element (MAC CE).

Figure 3:
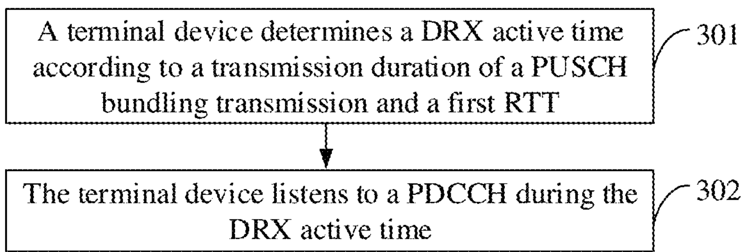
FIG. 3 is a schematic flowchart illustrating a method for determining a DRX active time according to an embodiment of the disclosure.

As illustrated in FIG. 3, an embodiment of the disclosure provides a method for determining a DRX active time. The method includes the following operations.

At operation 301, a terminal device determines the DRX active time according to a transmission duration of a PUSCH bundling transmission and a first RTT.

At operation 302, the terminal device listens to a PDCCH during the DRX active time.

Optionally, the first RTT is determined according to any of the following parameters.

(a) The first RTT between the terminal device and a base station, i.e., a UE-eNB RTT value.

(b) A timing advance value of the terminal device, i.e., a UE TA value.

(c) A second RTT between the terminal device and a satellite, i.e., a UE-satellite RTT value.

(d) A first total time of the first RTT and a network device processing time.

(e) A second total time of the timing advance value of the terminal device and the network device processing time.

(f) A third total time of the second RTT and the network device processing time.

Optionally, the first RTT may be a value rounded up in milliseconds according to any of the parameters (a), (b), (c), (d), (e) and (f).

Optionally, the first RTT may be a value rounded down in milliseconds according to any of the parameters (a), (b), (c), (d), (e) and (f).

Optionally, the network device processing time includes the following processing times.

1) A satellite processing time.

2) A base station processing time.

3) A satellite processing time and a base station processing time.

Optionally, the above network device processing time can be configured through system message broadcasting.

Optionally, the above network device processing time can be configured by RRC dedicated signaling.

Optionally, in embodiments of the disclosure, the above operation 301 may include, but not be limited to, following implementations.

(1) One Implementation:

The terminal device may determine a first moment according to an end moment of a first repeated transmission of the PUSCH bundling (also referred to as PUSCH bundle) transmission and the first RTT, and may determine to enter the DRX active time at the first moment in response to the first moment being within the transmission duration of the PUSCH bundling transmission.

A first time interval is greater than or equal to the first RTT, and the first time interval is a time interval between the first moment and the end moment of the first repeated transmission.

The transmission duration of the PUSCH bundling transmission refers to the transmission duration of PUSCH bundle.

That is, in the case that the first RTT is less than the transmission duration of the PUSCH bundling transmission, it can be determined that the DRX active time is entered at the first moment within the transmission duration of the PUSCH bundling transmission.

Optionally, when it is determined that the DRX active time is entered in the first moment, the terminal device is in the DRX active time from the first moment to the transmission end moment of the PUSCH bundling transmission, and the terminal device may listen to the PDCCH during the DRX active time.

For example, as illustrated in FIG. 4, the first moment T2, which is a moment to enter the DRX active time, may be determined according to the end moment T1 of the first repeated transmission of the PUSCH bundling transmission and the first RTT. From the moment T2 to the transmission end moment T3 of the PUSCH bundling transmission, the terminal device may be in the DRX active time and listen to the PDCCH.

(2) Another Implementation:

If the first RTT is less than or equal to the transmission duration of the PUSCH bundling transmission and if uplink HARQ-ACK feedback information transmitted by a network device has not been received after a last repeated transmission of the PUSCH bundling transmission is completed, a first timer is started at a target subframe.

The first timer corresponds to a HARQ process used for the PUSCH bundling transmission, a running time of the first timer is in the DRX active time. The target subframe is a subframe in which the last repeated transmission of the PUSCH bundling transmission is located, or a next subframe of the subframe in which the last repeated transmission of the PUSCH bundling transmission is located.

Optionally, the timing duration of the first timer is determined according to the first RTT.

Optionally, the timing time of the first timer is greater than or equal to the first RTT.

Optionally, the timing duration of the first timer is a first time interval.

Optionally, the first timer is a first uplink retransmission timer. The timing duration of the first timer is configured by the network device, or the timing duration of the first timer is determined according to the first RTT, and a duration of the first uplink retransmission timer configured by the network device for a terminal device.

The duration of the first uplink retransmission timer refers to a timing duration of the first uplink retransmission timer configured by the network device for the terminal device.

Optionally, the first timer is a first uplink retransmission timer. The timing duration of the first timer is the sum of the first RTT and the duration of the first uplink retransmission timer configured by the network device for the terminal device.

Optionally, the first timer is a first uplink retransmission timer. The timing duration of the first timer is the sum of the first time interval and the duration of the first uplink retransmission timer configured by the network device for the terminal device.

(3) Another Implementation:

A terminal device starts a first timer if the first RTT is greater than the transmission duration of the PUSCH bundling transmission and if a terminal device has not received uplink HARQ-ACK feedback information transmitted by a network device when a first time offset elapses after a last repeated transmission of the PUSCH bundling transmission.

The first timer corresponds to a HARQ process used for the PUSCH bundling transmission, and the terminal device is in the DRX active time within a timing duration of the first timer.

Optionally, the timing duration of the first timer is determined according to the transmission duration of the PUSCH bundling transmission.

Optionally, the timing duration of the first timer is determined according to a duration of the first uplink retransmission timer configured by the network device for the terminal device.

Optionally, the timing duration of the first timer is determined according to the transmission duration of the PUSCH bundling transmission and a duration of the first uplink retransmission timer configured by the network device for the terminal device.

Optionally, the first time offset is determined according to the transmission duration of the PUSCH bundling transmission and the first RTT.

Optionally, the timing duration of the first timer is equal to the transmission duration of the PUSCH bundling transmission.

Optionally, the first time offset is equal to a difference between the first RTT and the transmission duration of the PUSCH bundling transmission.

Optionally, the first timer is a first uplink retransmission timer. The timing duration of the first timer is a sum of the duration of the first uplink retransmission timer configured by the network device for the terminal device and the transmission duration of the PUSCH bundling transmission.

Optionally, the first timer is a first uplink retransmission timer. The first time offset is equal to a difference between the first RTT and the transmission duration of the PUSCH bundling transmission.

Optionally, the first timer is a first uplink retransmission timer. The timing duration of the first timer is configured by the network device.

Optionally, the first timer is a first uplink retransmission timer. The first time offset is equal to a difference between the first RTT and the transmission duration of the PUSCH bundling transmission.

(4) Another Implementation:

A first timer is started when a second time offset elapses after an end moment of a first repeated transmission of the PUSCH bundling transmission.

The first timer corresponds to a HARQ process used for the PUSCH bundling transmission, and the terminal device is in the DRX active time within a timing duration of the first timer.

Optionally, the second time offset is determined according to the first RTT.

Optionally, the timing duration of the first timer is determined according to the transmission duration of the PUSCH bundling transmission.

Optionally, the second time offset is equal to the first RTT.

Optionally, the timing duration of the first timer is equal to the transmission duration of the PUSCH bundling transmission.

The embodiments of the disclosure provide a method for determining a DRX active time. A terminal device can determine the DRX active time according to a transmission duration of a PUSCH bundling transmission and a first RTT. PDCCH listening is performed during the DRX active time determined by the solution. Since the transmission duration of the PUSCH bundling transmission and the first RTT are considered when determining the DRX active time, unnecessary PDCCH listening will not be caused even in the scene where the RTT time is longer, thereby saving the power of the terminal device.

Optionally, a first timer is started when a second time offset elapses after an end moment of a first repeated transmission of the PUSCH bundling transmission. If first information is received before the first timer expires, the first timer is stopped.

The first information includes at least one of the following information.

1) Uplink HARQ-ACK feedback information.
2) An uplink grant (UL grant) indication for scheduling a new transmission.

Optionally, for the implementations of the above (1), (2), (3) and (4), in case that the first timer is not an uplink retransmission timer, the method further includes the following operations.

A first uplink retransmission timer is started when the first timer expires.

The first uplink retransmission timer corresponds to the HARQ process used for the PUSCH bundling transmission.

Optionally, for the implementations of above (1), (2), (3) and (4), in case that the first timer is an uplink retransmission timer and the first RTT is less than or equal to the transmission duration of the PUSCH bundling transmission, if first information is received, the first timer is stopped, which includes the following operations.

The first uplink retransmission timer is stopped if the first information is received and the first uplink retransmission timer has been running for a period of time which is less than or equal to the first RTT.

Optionally, for the implementations of above (1), (2), (3) and (4), in case that the first timer is an uplink retransmission timer and the first RTT is longer than the transmission duration of the PUSCH bundling transmission, the first uplink retransmission timer is stopped if the first information is received and the first uplink retransmission timer has been running for a period of time that is less than or equal to the transmission duration of the PUSCH bundling transmission. Optionally, for the implementations of above (1), (2), (3) and (4), in case that the first timer is an uplink retransmission timer and the first RTT is longer than the transmission duration of the PUSCH bundling transmission, before the first uplink retransmission timer expires, uplink retransmission timers correspond to all HARQ processes are stopped if the HARQ-ACK feedback information transmitted by the network device is received and the first uplink retransmission timer has been running for a period of time which exceeds the transmission duration of the PUSCH bundling transmission.

Optionally, for the implementations of above (1), (2), (3) and (4), in case that the first timer is an uplink retransmission timer and the first RTT is less than or equal to the transmission duration of the PUSCH bundling transmission, before the first uplink retransmission timer expires, the first uplink retransmission timer is stopped if the HARQ-ACK feedback information transmitted by the network device is received and the first uplink retransmission timer has been running for a period of time which is less than or equal to the first RTT.

Optionally, for the implementations of above (1), (2), (3) and (4), in case that the first timer is an uplink retransmission timer and the first RTT is less than or equal to the transmission duration of the PUSCH bundling transmission, before the first uplink retransmission timer expires, uplink retransmission timers correspond to all HARQ processes are stopped if the HARQ-ACK feedback information transmitted by the network device is received and the first uplink retransmission timer has been running for a period of time which exceeds the first RTT.

In the embodiment of the disclosure, before the first timer expires, in some case, a first uplink retransmission timer corresponding to the uplink HARQ process corresponding to the first timer can be stopped, or all uplink retransmission timers corresponding to the uplink HARQ process corresponding to the first timer can be stopped, so that the DRX active time may be flexibly adjusted and the period of listening to the PDCCH may also be flexibly adjusted.

In order to more clearly explain the method for determining the DRX active time provided by the embodiments of the disclosure, the following embodiments 1 to 4 are used for explanation.

Embodiment 1

For a UE configured with mpdcch-UL-HARQ-ACK-FeedbackConfig, determining the DRX active time of the UE includes the following operations.

At operation 1.1, for the UE configured with mpdcch-UL-HARQ-ACK-FeedbackConfig, within the transmission duration of the PUSCH bundle, it can be determined, according to the transmission duration of the PUSCH bundle and the first RTT, that the DRX active time is entered at the first moment.

The UE performs a repeated transmission within a PUSCH bundle at a first moment and the time interval between the first moment and the end moment of the first repeated transmission of the PUSCH bundle is greater than or equal to the first RTT.

At operation 1.2, if the UE has not received the UL HARQ ACK feedback transmitted by the base station after a last repeated transmission of the PUSCH bundle, the DRX active time of the UE is determined according to one of following three cases a), b) and c).

a) If the first RTT is less than or equal to the transmission duration of the PUSCH bundle, the UE starts a first timer corresponding to the HARQ process used for the PUSCH bundling transmission in a next subframe of a subframe in which the last repeated transmission of the PUSCH bundle is completed, and the duration of the first timer is equal to the first RTT.

b) If the first RTT is less than or equal to the transmission duration of the PUSCH bundle, the UE starts a first timer corresponding to the HARQ process used for the PUSCH bundling transmission in a subframe in which the last repeated transmission of the PUSCH bundle is completed, and the duration of the first timer is equal to the first RTT.

As an example, as illustrated in FIG. 5, it is a schematic diagram illustrating a determined DRX active time of a UE in case that a first RTT is less than or equal to a transmission duration of a PUSCH bundle. The HARQ process used for the PUSCH bundling transmission is identified as HARQ ID 0. The end moment of the first repeated transmission of the PUSCH bundle is T1. A first moment T2 is determined when a first RTT elapses after T1. Then the DRX active time is entered at the first moment T2. The first timer is started at the transmission end moment T3 of the PUSCH bundle (which can be a next subframe of a subframe in which the last repeated transmission of the PUSCH bundle is completed, or a subframe in which the last repeated transmission of the PUSCH bundle is completed). The uplink retransmission timer (drx-ULRetransmissionTimer) corresponding to the HARQ ID 0 is started at the expiring moment T4 of the first timer. The time interval between T2 and T4 is equal to the transmission duration of the PUSCH bundle.

c) If the first RTT is greater than the transmission duration of the PUSCH bundle, the UE starts the first timer corresponding to the HARQ process used for the PUSCH bundling transmission when a first time offset elapses after a last repeated transmission of the PUSCH, the first time offset is a difference between the first RTT and a transmission duration of the PUSCH bundle, and the timing duration of the first timer is equal to a transmission duration of the PUSCH bundle.

As an example, as illustrated in FIG. 6, it is a schematic diagram illustrating a determined DRX active time of a UE in case that the first RTT is greater than the transmission duration of the PUSCH bundle. The HARQ process used for the PUSCH bundling transmission is identified as HARQ ID 0. It is assumed that the transmission end moment of the PUSCH bundle is T3, and the first time offset is represented as Ts. As illustrated in FIG. 6, the first timer corresponding to the HARQ ID 0 may be started at the moment T5 which is a moment when the Ts elapses after the transmission end moment T3 of the PUSCH bundle. The uplink retransmission timer (drx-ULRetransmissionTimer) corresponding to the HARQ ID 0 can be started at the expiring moment T6 of the first timer. The timing duration of the first timer is equal to the transmission duration of the PUSCH bundle, and the time interval between T1 and T5 is equal to the first RTT.

In view of the above three cases a), b) and c):

During the running time of the first timer corresponding to the uplink HARQ process, the UE is in the DRX active time. That is, the UE listens to the PDCCH during this duration.

Further, the following contents are included.

Optionally, during the running time of the first timer corresponding to the HARQ process used for the PUSCH bundling transmission, if the UL HARQ ACK feedback for the HARQ process transmitted by the base station is received by the UE, the UE stops the first timer corresponding to the HARQ process.

Optionally, during the running time of the first timer corresponding to the HARQ process used for the PUSCH bundling transmission, if a UL grant for scheduling a new transmission is received by the UE, the UE stops the first timer corresponding to the HARQ process. Optionally, if the first timer expires, the UE can start a drx-ULRetransmissionTimer corresponding to the HARQ process used for the PUSCH bundling transmission.

Embodiment 2

For a UE configured with mpdcch-UL-HARQ-ACK-FeedbackConfig, determining the DRX active time of the UE includes the following operations.

At operation 2.1, the UE starts a first timer corresponding to a HARQ process used for a PUSCH bundling transmission when a second time offset elapses after an end moment of a first repeated transmission of PUSCH bundle transmitted by UE.

The second time offset is equal to the first RTT, and the timing duration of the first timer is equal to the transmission duration of the PUSCH bundle.

During the running time of the first timer, the UE is in a DRX active time, that is, during the DRX active time, the UE listens to a PDCCH.

During the running time of the first timer, in case that a UL HARQ ACK feedback for the HARQ process transmitted by the base station is received by the UE or in case that a UL grant for scheduling a new transmission is received by the UE, the UE stops the first timer corresponding to the uplink HARQ process.

In case that the first timer corresponding to the uplink HARQ process expires, the UE starts a drx-ULRetransmissionTimer corresponding to the HARQ process.

Figure 7:
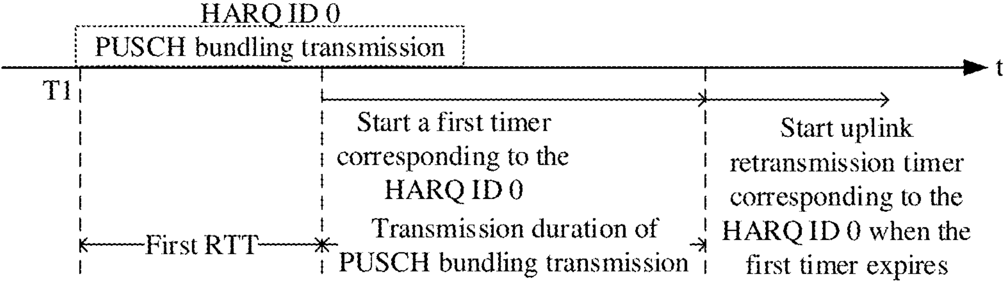
FIG. 7 is a fourth schematic diagram illustrating a determined DRX active time according to an embodiment of the disclosure.

As an example, as illustrated in FIG. 7, it is a schematic diagram illustrating a determined DRX active time of the UE in case that the first RTT is less than or equal to the transmission duration of the PUSCH bundle.

Figure 8:
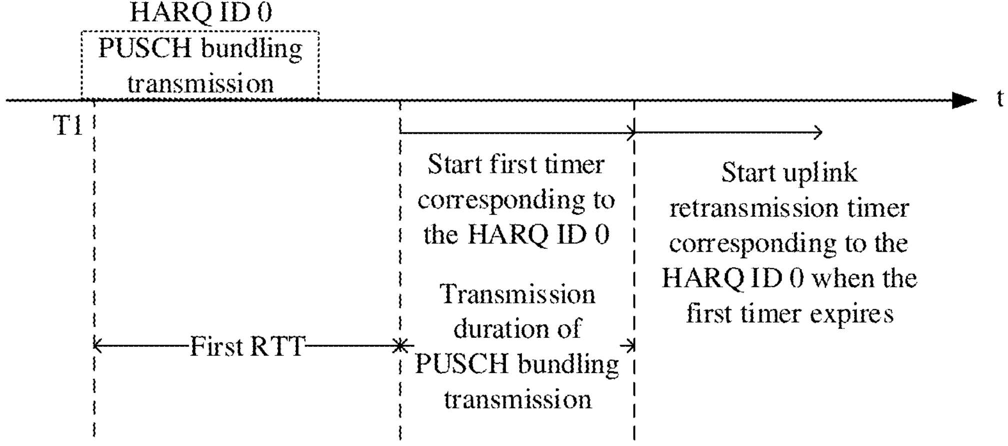
FIG. 8 is a fifth schematic diagram illustrating a determined DRX active time according to an embodiment of the disclosure.

As an example, as illustrated in FIG. 8, it is a schematic diagram illustrating a determined DRX active time of the UE in case that the first RTT is longer than the transmission duration of the PUSCH bundle.

In FIG. 7 and FIG. 8, the HARQ process used for the PUSCH bundling transmission is identified as HARQ ID 0. It is assumed that the second time offset is equal to the first RTT, the first timer corresponding to HARQ ID 0 may be started when the first RTT elapses after an end moment T1 of a first repeated transmission of the PUSCH bundle, and the drx-ULRetransmissionTimer corresponding to HARQ ID 0 may be started after the first timer expires. The timing duration of the first timer is the transmission duration of the PUSCH bundle.

Embodiment 3

For a UE configured with mpdcch-UL-HARQ-ACK-FeedbackConfig, determining the DRX active time of the UE includes the following operations.

At operation 3.1, for the UE configured with mpdcch-UL-HARQ-ACK-FeedbackConfig, within the transmission duration of the PUSCH bundle, it may be determined, according to the transmission duration of the PUSCH bundle and a first RTT, that the DRX active time is entered at a first moment.

The UE performs a repeated transmission within a PUSCH bundle at a first moment and the time interval between the first moment and the end moment of the first repeated transmission of the PUSCH bundle is greater than or equal to the first RTT.

At operation 3.2, if the UE has not received the UL HARQ ACK feedback transmitted by the base station after a last repeated transmission of the PUSCH bundle is transmitted by UE, the DRX active time of the UE is determined according to one of three cases d), e) and f).

d) If the first RTT is less than or equal to the transmission duration of the PUSCH bundle, the UE starts a drx-ULRetransmissionTimer corresponding to the HARQ process used for the PUSCH transmission in a next subframe of a subframe in which the last repeated transmission of the PUSCH bundle is completed.

The timing duration of the drx-ULRetransmissionTimer is: the first RTT and the timing duration of the drx-ULRetransmissionTimer configured by a network device through the RRC.

e) If the first RTT is less than or equal to the transmission duration of the PUSCH bundle, the UE starts the drx-ULRetransmissionTimer corresponding to the HARQ process used for the PUSCH transmission in a subframe in which the last repeated transmission of the PUSCH bundle is completed.

The timing duration of the drx-ULRetransmissionTimer is: the first RTT and the timing duration of the drx-ULRetransmissionTimer configured by the network device through the RRC.

Figure 9:
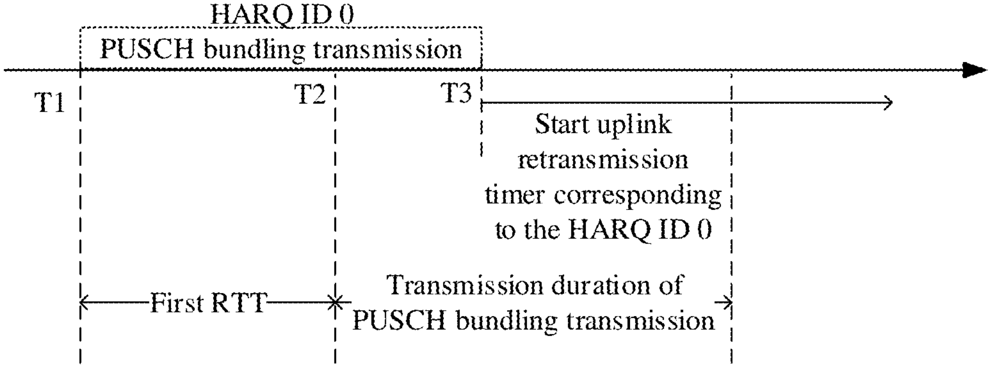
FIG. 9 is a sixth schematic diagram illustrating a determined DRX active time according to an embodiment of the disclosure.

As illustrated in FIG. 9, it is a schematic diagram illustrating a determined DRX active time of the UE in case of the first RTT is less than or equal to the transmission duration of the PUSCH bundle. The HARQ process used for the PUSCH bundling transmission is identified as HARQ ID 0. The end moment of the first repeated transmission of the PUSCH bundle is T1. A first moment T2 is determined when the first RTT elapses after T1. The DRX active time is entered at the first moment T2. The drx-ULRetransmissionTimer is started at the transmission end moment T3 (which can be a next subframe of a subframe in which the last repeated transmission of the PUSCH bundle is completed, or a subframe in which the last repeated transmission of the PUSCH bundle is completed) of the PUSCH bundle.

f) If the first RTT is greater than the transmission duration of the PUSCH bundle, the UE starts drx-ULRetransmissionTimer corresponding to the HARQ process used for the PUSCH bundling transmission when a first time offset elapses after a last repeated transmission of the PUSCH.

The first time offset is a difference between the first RTT and a transmission duration of the PUSCH bundle, and the timing duration of the drx-ULRetransmissionTimer is: the first RTT and the timing duration of the drx-ULRetransmissionTimer configured by network device through the RRC.

Figures 10, 11, 12:
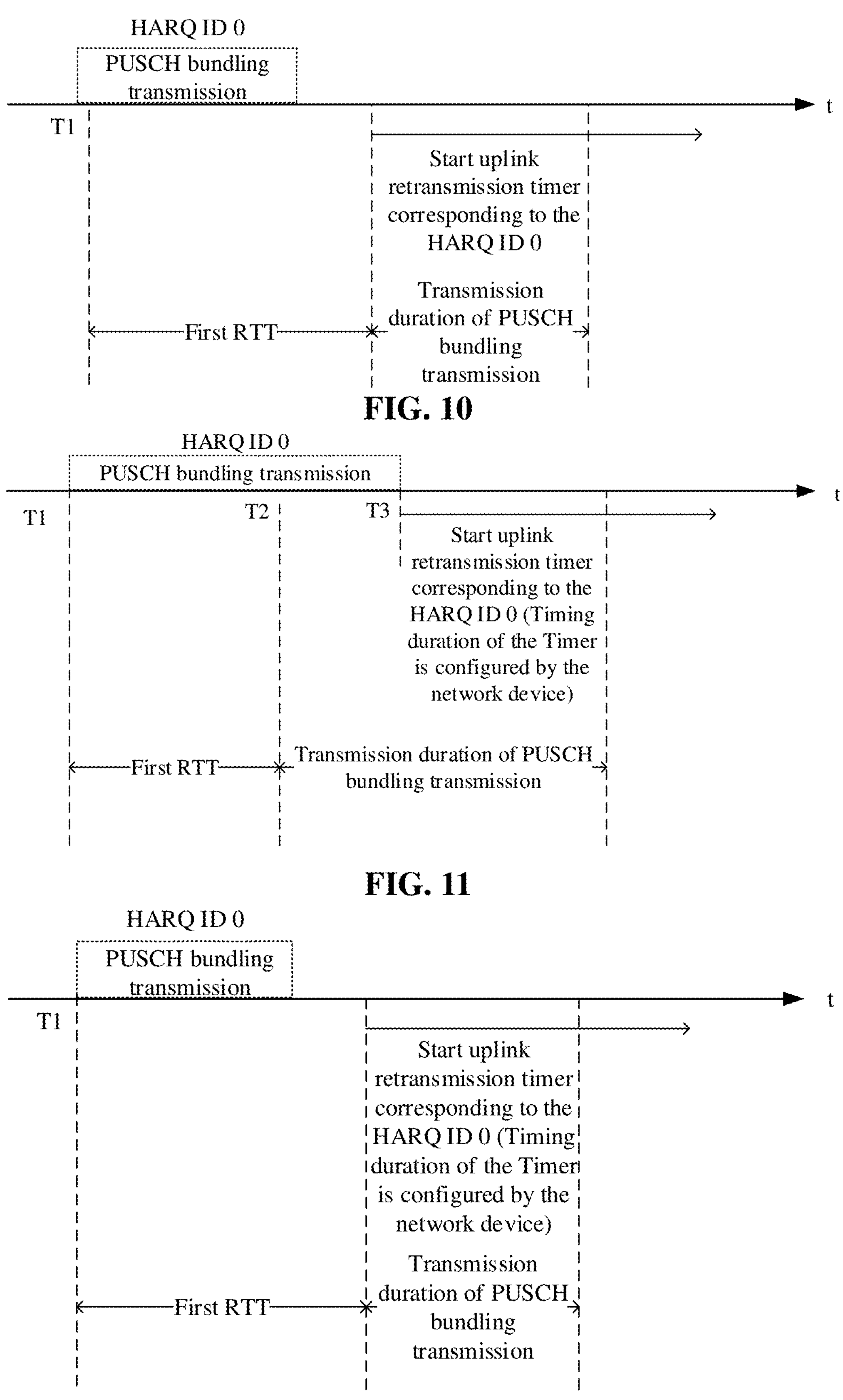
FIG. 10 is a seventh schematic diagram illustrating a determined DRX active time according to an embodiment of the disclosure.
FIG. 11 is an eighth schematic diagram illustrating a determined DRX active time according to an embodiment of the disclosure.
FIG. 12 is a ninth schematic diagram illustrating a determined DRX active time according to an embodiment of the disclosure.

As illustrated in FIG. 10, it is a schematic diagram illustrating a determined DRX active time of the UE in case that the first RTT is greater than the transmission duration of the PUSCH bundle. The HARQ process used for the PUSCH bundling transmission is identified as HARQ ID 0. An end moment of a first repeated transmission of the PUSCH bundle is T1, the drx-ULRetransmissionTimer is started when the first time offset (i.e., the first RTT) elapses after T1.

Further, the following contents are included.

Optionally, during the running time of the drx-ULRetransmissionTimer corresponding to the HARQ process used for the PUSCH bundling transmission, if the UL HARQ ACK feedback transmitted by the base station is received by the UE or if a UL grant for scheduling a new transmission is received by the UE, then the following operations is performed:

If the first RTT is less than or equal to the transmission duration of the PUSCH bundle, and if the drx-ULRetransmissionTimer corresponding to the uplink HARQ process has been running for a period of time which is less than or equal to the first RTT, the UE stops the drx-ULRetransmissionTimer corresponding to the uplink HARQ process;

If the first RTT is longer than the transmission duration of the PUSCH bundle, and if the drx-ULRetransmissionTimer corresponding to the uplink HARQ process has been running for a period of time which is less than or equal to the transmission duration of the PUSCH bundle, the UE stops drx-ULRetransmissionTimer corresponding to the uplink HARQ process.

Optionally, during the running time of the drx-ULRetransmissionTimer corresponding to the uplink HARQ process, if the UL HARQ ACK feedback transmitted by the base station is received by the UE, then the following operations is performed:

If the first RTT is less than or equal to the transmission duration of the PUSCH bundle, and if the drx-ULRetransmissionTimer corresponding to the uplink HARQ process has been running for a period of time which that is longer than the first RTT, the UE stops drx-ULRetransmissionTimer corresponding to all uplink HARQ processes;

If the first RTT is greater than the transmission duration of the PUSCH bundle, and if the drx-ULRetransmissionTimer corresponding to the uplink HARQ process has been running for a period of time which exceeds the transmission duration of the PUSCH bundle, the UE stops drx-ULRetransmissionTimer corresponding to all uplink HARQ processes.

Embodiment 4

For a UE configured with mpdcch-UL-HARQ-ACK-FeedbackConfig, determining the DRX active time of the UE includes the following operations.

At operation 4.1, for the UE configured with the mpdcch-UL-HARQ-ACK-FeedbackConfig, within the transmission duration of the PUSCH bundle, it can be determined, according to the transmission duration of the PUSCH bundle and the first RTT, that the DRX active time is entered at the first moment.

The UE performs a repeated transmission within a PUSCH bundle at a first moment and the time interval between the first moment and the end moment of the first repeated transmission of the PUSCH bundle is greater than or equal to the first RTT.

At operation 4.2, if the UE has not received the UL HARQ ACK feedback transmitted by the base station after a last repeated transmission of the PUSCH bundle is transmitted by the UE, the DRX active time of the UE is determined according to one of three cases g), h) and i).

g) If the first RTT is less than or equal to the transmission duration of the PUSCH bundle, the UE starts the drx-ULRetransmissionTimer corresponding to the HARQ process used for the PUSCH bundling transmission in a next subframe of a subframe in which the last repeated transmission of the PUSCH bundle is completed.

The duration of the drx-ULRetransmissionTimer is configured by the network via RRC.

h) If the first RTT is less than or equal to the transmission duration of the PUSCH bundle, the UE starts the drx-ULRetransmissionTimer corresponding to the HARQ process used for the PUSCH bundling transmission in a subframe in which the last repeated transmission of the PUSCH bundle is completed.

As illustrated in FIG. 11, it is a schematic diagram illustrating a determined DRX active time of the UE in case that the first RTT is less than or equal to the transmission duration of the PUSCH bundle. The HARQ process used for the PUSCH bundling transmission is identified as HARQ ID 0. The end moment of the first repeated transmission of the PUSCH bundle is T1. A first moment T2 is determined when a first RTT elapses after T1, the duration from T2 to T3 is in the DRX active time. the drx-ULRetransmissionTimer is started at the transmission end moment T3 (which can be a next subframe of a subframe in which the last repeated transmission of the PUSCH bundle is completed, or a subframe in which the last repeated transmission of the PUSCH bundle is completed) of the PUSCH bundle. The timing duration of the drx-ULRetransmissionTimer is configured by the network device.

As illustrated in FIG. 12, it is a schematic diagram illustrating a determined DRX active time of the UE in case that the first RTT is longer than the transmission duration of the PUSCH bundle. The HARQ process used for the PUSCH bundling transmission is identified as HARQ ID 0. An end moment of a first repeated transmission of the PUSCH bundle is T1, the drx-ULRetransmissionTimer is started when a first time offset (i.e., the first RTT) elapses after T1. The timing duration of the drx-ULRetransmissionTimer is configured by the network device.

i) If the first RTT is longer than the transmission duration of the PUSCH bundle, the UE starts the drx-ULRetransmissionTimer corresponding to the HARQ process used for the PUSCH bundling transmission when a first time offset elapses after a last repeated transmission of the PUSCH. The first time offset=the first RTT−the transmission duration of PUSCH bundle, and the timing duration of the drx-ULRetransmissionTimer is configured by the network device through RRC.

Further, the following contents are included.

Optionally, during the running time of the drx-ULRetransmissionTimer corresponding to the HARQ process used for the PUSCH bundling transmission, if the UL HARQ ACK feedback transmitted by the base station (for this HARQ process) is received by the UE or if a UL grant for scheduling a new transmission is received by the UE, then the following operations is performed:

If the first RTT is less than or equal to the transmission duration of the PUSCH bundle, and if the drx-ULRetransmissionTimer corresponding to the uplink HARQ process has been running for a period of time which is less than or equal to the first RTT, the UE stops the drx-ULRetransmissionTimer corresponding to the uplink HARQ process;

If the first RTT is longer than the transmission duration of the PUSCH bundle, and if the drx-ULRetransmissionTimer corresponding to the uplink HARQ process has been running for a period of time which is less than or equal to this transmission duration of the PUSCH bundle, the UE stops the drx-ULRetransmissionTimer corresponding to the uplink HARQ process.

Optionally, during the running time of the drx-ULRetransmissionTimer corresponding to the uplink HARQ process used for the PUSCH bundling transmission, if the UL HARQ ACK feedback transmitted by the base station is received by the UE, then the following operations is performed:

If the first RTT is less than or equal to the transmission duration of the PUSCH bundle, and if the drx-ULRetransmissionTimer corresponding to the uplink HARQ process has been running for a period of time which exceeds the first RTT, the UE stops drx-ULRetransmissionTimer corresponding to all uplink HARQ processes.

If the first RTT is greater than the transmission duration of the PUSCH bundle, and if the drx-ULRetransmissionTimer corresponding to the uplink HARQ process has been running for a period of time which exceeds this transmission duration of the PUSCH bundle, the UE stops drx-ULRetransmissionTimer corresponding to all uplink HARQ processes.

Figures 13, 14:
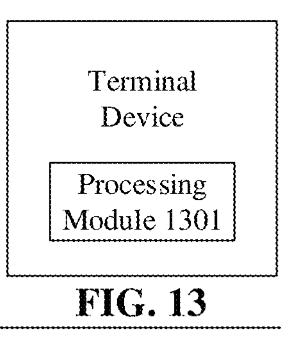
FIG. 13 is a structural schematic diagram illustrating a terminal device according to the embodiment of the disclosure.
FIG. 14 is a schematic diagram of a hardware structure illustrating a terminal device according to an embodiment of the disclosure.

As illustrated in FIG. 13, an embodiment of the disclosure provides a terminal device which includes a processing module 1301.

The processing module 1301 is configured to determine a Discontinuous Reception (DRX) active time according to a transmission duration of a Physical Uplink Shared Channel (PUSCH) bundling transmission and a first Round Trip Time (RTT).

Optionally, the processing module 1301 is specifically configured to: determine a first moment according to an end moment of a first repeated transmission of the PUSCH bundling transmission and the first RTT; and determine to enter the DRX active time at the first moment in response to the first moment being within the transmission duration of the PUSCH bundling transmission.

A first time interval is greater than or equal to the first RTT, and the first time interval is a time interval between the first moment and the end moment of the first repeated transmission.

Optionally, the processing module 1301 is specifically configured to: start a first timer at a target subframe, in case that the first RTT is less than or equal to the transmission duration of the PUSCH bundling transmission and in case that uplink Hybrid Automatic Repeat Request (HARQ) Acknowledgement (HARQ-ACK) feedback information transmitted by a network device has not been received after a last repeated transmission of the PUSCH bundling transmission.

The first timer corresponds to a HARQ process used for the PUSCH bundling transmission, a running time of the first timer is in the DRX active time, and the target subframe is a subframe in which the last repeated transmission of the PUSCH bundling transmission is located, or a next subframe of a subframe in which the last repeated transmission of the PUSCH bundling transmission is located.

Optionally, a timing duration of the first timer is determined according to the first RTT.

Optionally, the timing time of the first timer is greater than or equal to the first RTT.

Optionally, the timing duration of the first timer is a first time interval.

Optionally, the first timer is a first uplink retransmission timer.

A timing duration of the first timer is configured by the network device; or, a timing duration of the first timer is determined according to the first RTT, and a duration of the first uplink retransmission timer configured by the network device for a terminal device.

Optionally, the timing duration of the first timer is a sum of the first RTT, and the duration of the first uplink retransmission timer configured by the network device for the terminal device.

Optionally, the timing duration of the first timer is the sum of a first time interval, and the duration of the first uplink retransmission timer configured by the network device for the terminal device.

Optionally, the processing module 1301 is specifically configured to: start a first timer in case that the first RTT is greater than the transmission duration of the PUSCH bundling transmission and in case that the terminal device has not received uplink Hybrid Automatic Repeat Request (HARQ) Acknowledgement (HARQ-ACK) feedback information transmitted by a network device when a first time offset elapses after a last repeated transmission of the PUSCH bundling transmission.

The first timer corresponds to a HARQ process used for the PUSCH bundling transmission, and a timing duration of the first timer is in the DRX active time.

Optionally, the timing duration of the first timer is determined according to at least one of: the transmission duration of the PUSCH bundling transmission or a duration of a first uplink retransmission timer configured by the network device for the terminal device.

And/or, the first time offset is determined according to the transmission duration of the PUSCH bundling transmission and the first RTT.

Optionally, the timing duration of the first timer is equal to the transmission duration of the PUSCH bundling transmission.

And/or, the first time offset is equal to a difference between the first RTT and the transmission duration of the PUSCH bundling transmission.

Optionally, the first timer is the first uplink retransmission timer.

The timing duration of the first timer is a sum of the duration of the first uplink retransmission timer configured by the network device for the terminal device and the transmission duration of the PUSCH bundling transmission And/or, the first time offset is equal to a difference between the first RTT and the transmission duration of the PUSCH bundling transmission.

Optionally, the first timer is the first uplink retransmission timer.

The timing duration of the first timer is configured by the network device.

And/or, the first time offset is equal to a difference between the first RTT and the transmission duration of the PUSCH bundling transmission.

Optionally, the processing module 1301 is specifically configured to: start a first timer when a second time offset elapses after an end moment of a first repeated transmission of the PUSCH bundling transmission.

The first timer corresponds to a Hybrid Automatic Repeat Request (HARQ) process used for the PUSCH bundling transmission, and a timing duration of the first timer is in the DRX active time.

Optionally, the second time offset is determined according to the first RTT.

And/or, the timing duration of the first timer is determined according to the transmission duration of the PUSCH bundling transmission.

Optionally, the second time offset is equal to the first RTT.

And/or, the timing duration of the first timer is equal to the transmission duration of the PUSCH bundling transmission.

Optionally, the processing module 1301 is further configured to: before the first timer expires, stop the first timer in response to receiving first information.

The first information comprises at least one of: the uplink HARQ Acknowledgement (HARQ-ACK) feedback information or an uplink grant indication for scheduling a new transmission.

Optionally, the processing module 1301 is further configured to: start a first uplink retransmission timer in response to the first timer expiring.

The first uplink retransmission timer corresponds to the HARQ process used for the PUSCH bundling transmission.

Optionally, the first timer is a first uplink retransmission timer.

In case that the first RTT is less than or equal to the transmission duration of the PUSCH bundling transmission, the processing module 1301 is specifically configured to: stop the first uplink retransmission timer in response to that the first information is received and the first uplink retransmission timer has been running for a period of time which is less than or equal to the first RTT.

Optionally, the first timer is a first uplink retransmission timer.

In case that the first RTT is greater than the transmission duration of the PUSCH bundling transmission, the processing module 1301 is specifically configured to: stop the first uplink retransmission timer in response to that first information is received and the first uplink retransmission timer has been running for a period of time which is being less than or equal to the transmission duration of the PUSCH bundling transmission.

Optionally, the processing module 1301 is further configured to: in case that the first RTT is less than or equal to the transmission duration of the PUSCH bundling transmission, before the first uplink retransmission timer expires, stop uplink retransmission timers correspond to all HARQ processes in response to that the HARQ-ACK feedback information transmitted by the network device is received and the first uplink retransmission timer has been running for a period of time which exceeds the first RTT.

Optionally, the processing module 1301 is further configured to: in case that the first RTT is greater than the transmission duration of the PUSCH bundling transmission, before the first uplink retransmission timer expires, stop uplink retransmission timers correspond to all HARQ processes in response to that the HARQ-ACK feedback information transmitted by the network device is received and the first uplink retransmission timer has been running for a period of time which exceeds the transmission duration of the PUSCH bundling transmission.

Optionally, the first RTT is determined according to at least one of the following parameters: a first RTT between the terminal device and a base station; a timing advance value of the terminal device; a second RTT between the terminal device and a satellite; a first total time of the first RTT and a network device processing time; a second total time of the timing advance value of the terminal device and the network device processing time; or a third total time of the second RTT and the network device processing time.

Optionally, the network device processing time includes at least one of: a satellite processing time or a base station processing time.

Optionally, the processing time of the network device is configured by system message broadcasting.

Or, the processing time of the network device is configured through RRC dedicated signaling.

Optionally, the terminal device is applied to a terminal device configured with Machine Type Communication (MTC) Physical Downlink Control Channel (MPDCCH) uplink Hybrid Automatic Repeat Request (HARQ) Acknowledgement (HARQ-ACK) feedback configuration information.

The embodiment of the disclosure also provides a terminal device, which includes: a memory storing executable program codes and a processor coupled to the memory.

The processor calls the executable program code stored in the memory to perform the method for determining the DRX active time performed by the terminal device in the embodiment of the disclosure.

As an example, as illustrated in FIG. 14, a terminal device is provided by an embodiment of the disclosure, the terminal device includes a radio frequency (RF) circuit 1410, a memory 1420, a processor 1430 and other components. The radio frequency circuit 1410 includes a receiver 1411 and a transmitter 1412. Those skilled in the art may understand that the structure of the terminal device illustrated in FIG. 14 does not constitute a limitation to the terminal device and may include more or fewer components than illustrated, or a combination of certain components, or different component arrangements.

The RF circuit 1410 can be used for receiving and transmitting signals during messaging or calls. Specifically, the RF circuit 1410 receive the downlink information from the base station and transmits it to the processor 1430 for processing. In addition, the RF circuit 1410 transmits the uplink data to the base station. Typically, RF circuit 1410 includes but is not limited to an antenna, at least one amplifier, a transceiver, a coupler, a low noise amplifier (LNA), a diplexer and the like. In addition, the RF circuit 1410 may also communicate with a network and other devices through wireless communication. The wireless communication may use any communication standard or protocol, including but not limited to the global system of mobile communication (GSM), general packet radio service (GPRS), code division multiple access (CDMA), wideband code division multiple access (WCDMA), long term evolution (LTE), E-mail, short messaging service (SMS), and so on.

The memory 1420 may be used to store software programs and modules, while the processor 1430 executes various functional applications and data processing of the terminal device by running the software programs and modules stored in the memory 1420. The memory 1420 may mainly include a stored program area and a stored data area, the stored program area may store an operating system, an application program required for at least one function (such as, a sound playback function, an image playback function, etc.), and the like. The storage data area may store data (such as audio data, telephone book, etc.) created according to the use of the terminal device. In addition, the memory 1420 may include a high-speed random access memory and may further include a non-volatile memory, for example, at least one disk memory device, a flash memory device or other volatile solid-state memory devices.

The processor 1430 is a control center that connects various parts of the entire terminal device by various interfaces and lines, executes various functions of the terminal device and processes data by running or executing software programs and/or modules stored in the memory 1420 and by calling data stored in the memory 1420, thereby monitoring the entire terminal device. Optionally, the processor 1430 may include one or more processing units. Preferably, the processor 1430 may integrate with an application processor and a modem processor; the application processor mainly processes the operating systems, user interfaces, application programs and the like. The modem processor mainly processes wireless communications. It can be understand that the modem processor described above may also not be integrated into the processor 1430.

In the embodiment of the disclosure, the processor 1430 is configured to determine a Discontinuous Reception (DRX) active time according to a transmission duration of a Physical Uplink Shared Channel (PUSCH) bundling transmission and a first Round Trip Time (RTT).

Optionally, the processor 1430 is specifically configured to: determine a first moment according to an end moment of a first repeated transmission of the PUSCH bundling transmission and the first RTT; and determine to enter the DRX active time at the first moment in response to the first moment being within the transmission duration of the PUSCH bundling transmission.

A first time interval is greater than or equal to the first RTT, and the first time interval is a time interval between the first moment and the end moment of the first repeated transmission.

Optionally, the processor 1430 is specifically configured to: start a first timer at a target subframe, in response to that the first RTT is less than or equal to the transmission duration of the PUSCH bundling transmission and in response to that uplink Hybrid Automatic Repeat Request (HARQ) Acknowledgement (HARQ-ACK) feedback information transmitted by a network device has not been received after a last repeated transmission of the PUSCH bundling transmission.

The first timer corresponds to a HARQ process used for the PUSCH bundling transmission, a running time of the first timer is in the DRX active time, and the target subframe is a subframe in which the last repeated transmission of the PUSCH bundling transmission is located, or a next subframe of a subframe in which the last repeated transmission of the PUSCH bundling transmission is located.

Optionally, a timing duration of the first timer is determined according to the first RTT.

Optionally, the timing time of the first timer is greater than or equal to the first RTT.

Optionally, the timing duration of the first timer is a first time interval.

Optionally, the first timer is a first uplink retransmission timer.

A timing duration of the first timer is configured by the network device; or, a timing duration of the first timer is determined according to the first RTT, and a duration of the first uplink retransmission timer configured by the network device for a terminal device.

Optionally, the timing duration of the first timer is a sum of the first RTT, and the duration of the first uplink retransmission timer configured by the network device for the terminal device.

Optionally, the timing duration of the first timer is the sum of a first time interval, and the duration of the first uplink retransmission timer configured by the network device for the terminal device.

Optionally, the processor 1430 is specifically configured to: start a first timer in case that the first RTT is greater than the transmission duration of the PUSCH bundling transmission and in case that a terminal device has not received uplink Hybrid Automatic Repeat Request (HARQ) Acknowledgement (HARQ-ACK) feedback information transmitted by a network device when a first time offset elapses after a last repeated transmission of the PUSCH bundling transmission.

The first timer corresponds to a HARQ process used for the PUSCH bundling transmission, and a timing duration of the first timer is in the DRX active time.

Optionally, the timing duration of the first timer is determined according to at least one of: the transmission duration of the PUSCH bundling transmission or a duration of a first uplink retransmission timer configured by the network device for the terminal device.

And/or, the first time offset is determined according to the transmission duration of the PUSCH bundling transmission and the first RTT.

Optionally, the timing duration of the first timer is equal to the transmission duration of the PUSCH bundling transmission.

And/or, the first time offset is equal to a difference between the first RTT and the transmission duration of the PUSCH bundling transmission.

Optionally, the first timer is the first uplink retransmission timer.

The timing duration of the first timer is a sum of the duration of the first uplink retransmission timer configured by the network device for the terminal device and the transmission duration of the PUSCH bundling transmission.

And/or, the first time offset is equal to a difference between the first RTT and the transmission duration of the PUSCH bundling transmission.

Optionally, the first timer is the first uplink retransmission timer.

The timing duration of the first timer is configured by the network device.

And/or, the first time offset is equal to a difference between the first RTT and the transmission duration of the PUSCH bundling transmission.

Optionally, the processor 1430 is specifically configured to: start a first timer when a second time offset elapses after an end moment of a first repeated transmission of the PUSCH bundling transmission.

The first timer corresponds to a Hybrid Automatic Repeat Request (HARQ) process used for the PUSCH bundling transmission, and a timing duration of the first timer is in the DRX active time.

Optionally, the second time offset is determined according to the first RTT.

And/or, the timing duration of the first timer is determined according to the transmission duration of the PUSCH bundling transmission.

Optionally, the second time offset is equal to the first RTT.

And/or, the timing duration of the first timer is equal to the transmission duration of the PUSCH bundling transmission.

Optionally, the processor 1430 is further configured to: before the first timer expires, stop the first timer in response to receiving first information.

The first information comprises at least one of: the uplink HARQ Acknowledgement (HARQ-ACK) feedback information or an uplink grant indication for scheduling a new transmission.

Optionally, the processor 1430 is further configured to: start a first uplink retransmission timer in response to the first timer expiring.

The first uplink retransmission timer corresponds to the HARQ process used for the PUSCH bundling transmission.

Optionally, the first timer is a first uplink retransmission timer.

In case that the first RTT is less than or equal to the transmission duration of the PUSCH bundling transmission, the processor 1430 is specifically configured to: stop the first uplink retransmission timer in response to that the first information is received and the first uplink retransmission timer has been running for a period of time which is less than or equal to the first RTT.

Optionally, the first timer is a first uplink retransmission timer.

In case that the first RTT is greater than the transmission duration of the PUSCH bundling transmission, the processor 1430 is specifically configured to: stop the first uplink retransmission timer in response to that the first information is received and the first uplink retransmission timer has been running for a period of time which is less than or equal to the transmission duration of the PUSCH bundling transmission.

Optionally, the processor 1430 is further configured to: in case that the first RTT is less than or equal to the transmission duration of the PUSCH bundling transmission, before the first uplink retransmission timer expires, stop uplink retransmission timers correspond to all HARQ processes in response to that the HARQ-ACK feedback information transmitted by the network device is received and the first uplink retransmission timer has been running for a period of time which exceeds the first RTT.

Optionally, the processor 1430 is further configured to: in case that the first RTT is greater than the transmission duration of the PUSCH bundling transmission, before the first uplink retransmission timer expires, stop uplink retransmission timers correspond to all HARQ processes in response to that the HARQ-ACK feedback information transmitted by the network device is received and the first uplink retransmission timer has been running for a period of time which exceeds the transmission duration of the PUSCH bundling transmission.

Optionally, the first RTT is determined according to at least one of the following parameters: a first RTT between the terminal device and a base station; a timing advance value of the terminal device; a second RTT between the terminal device and a satellite; a first total time of the first RTT and a network device processing time; a second total time of the timing advance value of the terminal device and the network device processing time; or a third total time of the second RTT and the network device processing time.

Optionally, the network device processing time includes at least one of: a satellite processing time or a base station processing time.

Optionally, the processing time of the network device is configured by system message broadcasting.

Or, the processing time of the network device is configured through RRC dedicated signaling.

Optionally, the terminal device is applied to a terminal device configured with Machine Type Communication (MTC) Physical Downlink Control Channel (MPDCCH) uplink Hybrid Automatic Repeat Request (HARQ) Acknowledgement (HARQ-ACK) feedback configuration information.

An embodiment of the disclosure provides a computer-readable storage medium, which includes computer instructions that, when run on a computer, cause the computer to perform various processes of the terminal device as described in the above method embodiments.

An embodiment of the disclosure provides a computer program product, which includes computer instructions. When the computer program product is running on a computer, the computer executes the computer instructions to cause the computer to perform various processes of the terminal device as described in the above method embodiments.

An embodiment of the disclosure provides a chip, which is coupled with the memory in the terminal device, causing the chip to call program instructions stored in the memory during runtime, such that the terminal device perform various processes of the terminal device as described in the above method embodiments.

The embodiments of the disclosure provide a method for determining a DRX active time. A terminal device can determine the DRX active time according to a transmission duration of a PUSCH bundling transmission and a first RTT. PDCCH listening is performed during the DRX active time determined by the solution, since the transmission duration of the PUSCH bundling transmission and the first RTT are considered when determining the DRX active time, unnecessary PDCCH listening will not be caused even in the scene where the RTT time is longer, thereby saving the power of the terminal device.

In the above-described embodiments, it may be fully or partially implemented by software, hardware, firmware or any combination thereof. When implemented in software, it may be fully or partially implemented in the form of a computer program product. The computer program product includes one or more computer instructions. When computer program instructions are loaded and executed on a computer, all or part of the processes or functions according to embodiments of the disclosure are generated. The computer may be a general computer, a specialized computer, a computer network, or other programmable device. Computer instructions may be stored in a computer-readable storage medium, or be transmitted from one computer-readable storage medium to another computer-readable storage medium. For example, computer instructions may be transmitted from one website site, computer, server, or data center to another web site site, computer, server, or data center through wired (such as, coaxial cable, optical fiber, digital subscriber line (DSL)) or wireless (such as, infrared, wireless, microwave, etc.). The computer-readable storage medium can be any available medium that a computer can store, or a data storage device such as a server or data center that contains one or more available media integrations. The available media can be magnetic media (such as, floppy disks, hard drives, magnetic tapes), optical media (such as, DVDs), or semiconductor media (such as, solid state hard drives (SSDs)) and the like.

The terms "first", "second", "third", "fourth", etc. (if present) in the specification and claims of the disclosure, as well as the above drawings, are used to distinguish similar objects and need not be used to describe a particular order or priority. It should be understood that the data used in this way can be interchanged in appropriate cases, so that the embodiments described herein can be implemented in order other than the content illustrated or described herein. In addition, the terms "including" and "having", as well as any variations thereof, are intended to cover non-exclusive inclusion. For example, a process, method, system, product, or device that includes a series of steps or units, need not be limited to those clearly listed steps or units, but may include other steps or units that are not clearly listed or inherent to these processes, methods, products, or devices.

What is claimed is:

1. A method for determining a Discontinuous Reception (DRX) active time, performed by a terminal device and comprising:

determining the DRX active time according to a transmission duration of a Physical Uplink Shared Channel (PUSCH) bundling transmission and a first Round Trip Time (RTT), wherein determining the DRX active time according to the transmission duration of the PUSCH bundling transmission and the first RTT comprises:

determining a first moment according to an end moment of a first repeated transmission of the PUSCH bundling transmission and the first RTT; and determining to enter the DRX active time at the first moment in response to the first moment being within the transmission duration of the PUSCH bundling transmission.

2. The method of claim 1, wherein a first time interval is greater than or equal to the first RTT, and the first time interval is a time interval between the first moment and the end moment of the first repeated transmission.

3. The method of claim 1, wherein determining the DRX active time according to the transmission duration of the PUSCH bundling transmission and the first RTT further comprises:

starting a first timer at a target subframe, in case that the first RTT is less than or equal to the transmission duration of the PUSCH bundling transmission and in case that uplink Hybrid Automatic Repeat Request (HARQ) Acknowledgement (HARQ-ACK) feedback information transmitted by a network device has not been received after a last repeated transmission of the PUSCH bundling transmission, wherein the first timer corresponds to a HARQ process used for the PUSCH bundling transmission, the terminal device is in the DRX active time during a running time of the first timer, and the target subframe is a subframe in which the last repeated transmission of the PUSCH bundling transmission is located, or a next subframe of a subframe in which the last repeated transmission of the PUSCH bundling transmission is located.

4. The method of claim 3, wherein the first timer is a first uplink retransmission timer; and a timing duration of the first timer is configured by the network device, or a timing duration of the first timer is determined according to the first RTT and a duration of the first uplink retransmission timer configured by the network device for the terminal device.

5. The method of claim 3, further comprising:

before the first timer expires, stopping the first timer in response to first information being received, wherein the first information comprises at least one of: the uplink HARQ Acknowledgement (HARQ-ACK) feedback information or an uplink grant indication for scheduling a new transmission.

6. The method of claim 5, wherein the first timer is a first uplink retransmission timer, and in case that the first RTT is less than or equal to the transmission duration of the PUSCH bundling transmission, stopping the first timer in response to receiving the first information comprises:

stopping the first uplink retransmission timer in response to that the first information is received and the first uplink retransmission timer has been running for a period of time which is less than or equal to the first RTT.

7. The method of claim 5, wherein the first timer is a first uplink retransmission timer, and in case that the first RTT is greater than the transmission duration of the PUSCH bundling transmission, stopping the first timer in response to receiving the first information comprises:

stopping the first uplink retransmission timer in response to that the first information is received and the first uplink retransmission timer has been running for a period of time which is less than or equal to the transmission duration of the PUSCH bundling transmission.

8. The method of claim 1, wherein determining the DRX active time according to the transmission duration of the PUSCH bundling transmission and the first RTT further comprises:

starting a first timer in case that the first RTT is greater than the transmission duration of the PUSCH bundling transmission and in case that the terminal device has not received uplink Hybrid Automatic Repeat Request (HARQ) Acknowledgement (HARQ-ACK) feedback information transmitted by a network device when a first time offset elapses after a last repeated transmission of the PUSCH bundling transmission, wherein the first timer corresponds to a HARQ process used for the PUSCH bundling transmission, and the terminal device is in the DRX active time during a timing duration of the first timer.

9. The method of claim 1, wherein the first RTT is determined according to at least one of the following parameters:

a first RTT between the terminal device and a base station;

a timing advance value of the terminal device;

a second RTT between the terminal device and a satellite;

a first total time of the first RTT and a network device processing time;

a second total time of the timing advance value of the terminal device and the network device processing time; or a third total time of the second RTT and the network device processing time.

10. The method of claim 1, wherein the method is applied to the terminal device configured with Machine Type Communication (MTC) Physical Downlink Control Channel (MPDCCH) uplink Hybrid Automatic Repeat Request (HARQ) Acknowledgement (HARQ-ACK) feedback configuration information.

11. A terminal device, comprising:

a processor, configured to: determine a Discontinuous Reception (DRX) active time according to a transmission duration of a Physical Uplink Shared Channel (PUSCH) bundling transmission and a first Round Trip Time (RTT), wherein the processor is further configured to:

determine a first moment according to an end moment of a first repeated transmission of the PUSCH bundling transmission and the first RTT; and determine to enter the DRX active time at the first moment in response to the first moment being within the transmission duration of the PUSCH bundling transmission.

12. The terminal device of claim 11, wherein a first time interval is greater than or equal to the first RTT, and the first time interval is a time interval between the first moment and the end moment of the first repeated transmission.

13. The terminal device of claim 11, wherein the processor is further configured to:

start a first timer at a target subframe, in case that the first RTT is less than or equal to the transmission duration of the PUSCH bundling transmission and in case that uplink Hybrid Automatic Repeat Request (HARQ) Acknowledgement (HARQ-ACK) feedback information transmitted by a network device has not been received after a last repeated transmission of the PUSCH bundling transmission, wherein the first timer corresponds to a HARQ process used for the PUSCH bundling transmission, the terminal device is in the DRX active time during a running time of the first timer, and the target subframe is a subframe in which the last repeated transmission of the PUSCH bundling transmission is located, or a next subframe of a subframe in which the last repeated transmission of the PUSCH bundling transmission is located.

14. The terminal device of claim 13, wherein the first timer is a first uplink retransmission timer; and a timing duration of the first timer is configured by the network device, or a timing duration of the first timer is determined according to the first RTT and a duration of the first uplink retransmission timer configured by the network device for the terminal device.

15. The terminal device of claim 13, wherein the processor is further configured to:

before the first timer expires, stop the first timer in response to first information being received, wherein the first information comprises at least one of: the uplink HARQ Acknowledgement (HARQ-ACK) feedback information or an uplink grant indication for a new transmission.

16. The terminal device of claim 15, wherein the first timer is a first uplink retransmission timer, and in case that the first RTT is less than or equal to the transmission duration of the PUSCH bundling transmission, the processor is specifically configured to:

stop the first uplink retransmission timer in response to that the first information is received and the first uplink retransmission timer has been running for a period of time which is less than or equal to the first RTT.

17. The terminal device of claim 15, wherein the first timer is a first uplink retransmission timer, and in case that the first RTT is greater than the transmission duration of the PUSCH bundling transmission, the processor is specifically configured to:

stop the first uplink retransmission timer in response to that the first information is received and the first uplink retransmission timer has been running for a period of time which is less than or equal to the transmission duration of the PUSCH bundling transmission.

18. The terminal device of claim 11, wherein the first RTT is determined according to at least one of the following parameters:

a first RTT between the terminal device and a base station;

a timing advance value of the terminal device;

a second RTT between the terminal device and a satellite;

a first total time of the first RTT and a network device processing time;

a second total time of the timing advance value of the terminal device and the network device processing time; or a third total time of the second RTT and the network device processing time.

19. The terminal device of claim 11, wherein the terminal device is a terminal device configured with Machine Type Communication (MTC) Physical Downlink Control Channel (MPDCCH) uplink Hybrid Automatic Repeat Request (HARQ) Acknowledgement (HARQ-ACK) feedback configuration information.

20. A non-transitory computer-readable storage medium having computer instructions that, when run on a computer, cause the computer to perform the following operations:

determining a DRX active time according to a transmission duration of a Physical Uplink Shared Channel (PUSCH) bundling transmission and a first Round Trip Time (RTT), wherein determining the DRX active time according to the transmission duration of the PUSCH bundling transmission and the first RTT comprises:

determining a first moment according to an end moment of a first repeated transmission of the PUSCH bundling transmission and the first RTT; and determining to enter the DRX active time at the first moment in response to the first moment being within the transmission duration of the PUSCH bundling transmission.

* * * * *